UNITED STATES PATENT OFFICE.

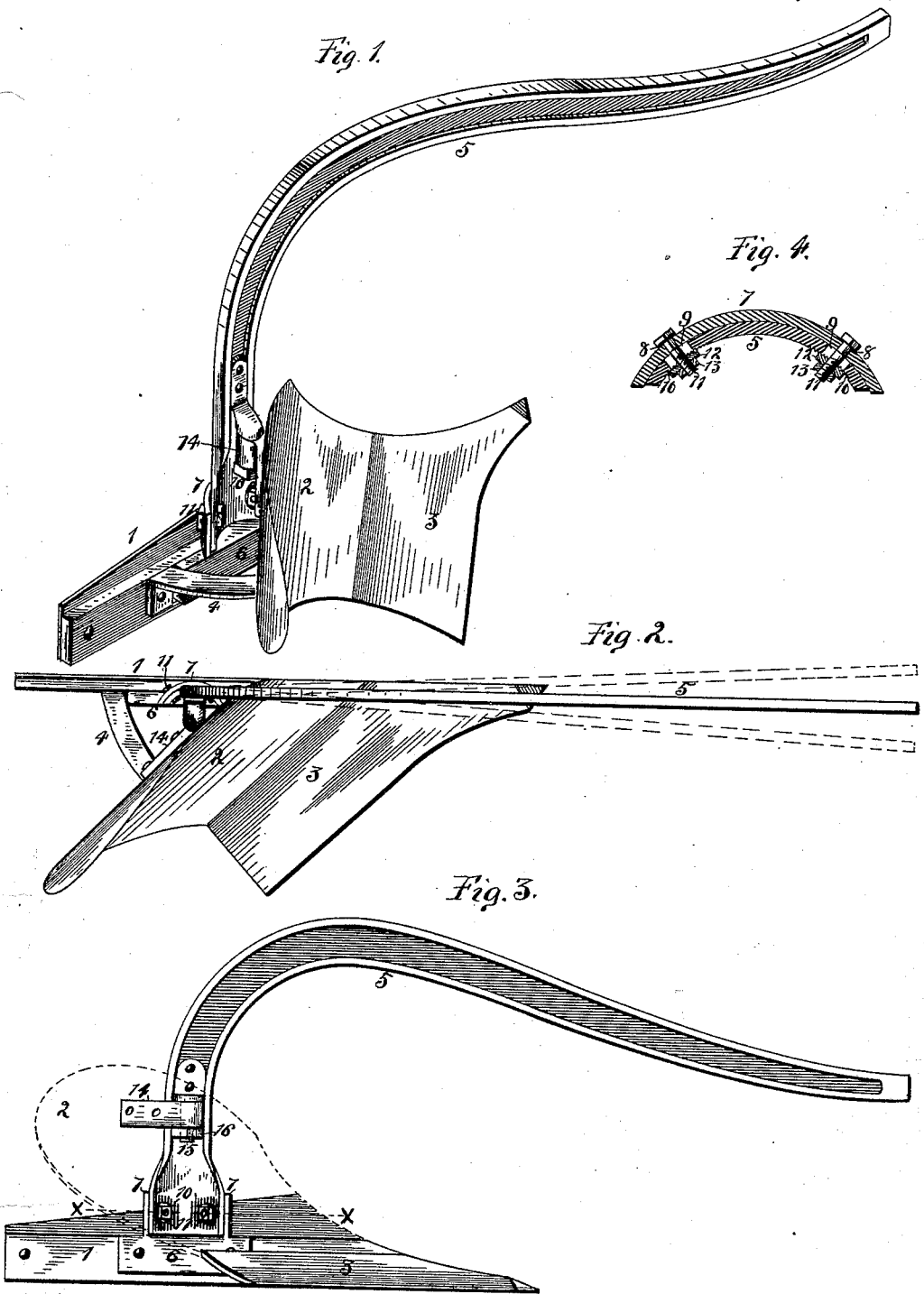

CARELIUS HANSEN, OF BELOIT, WISCONSIN.

PLOW.

SPECIFICATION forming part of Letters Patent No. 424,294, dated March 25, 1890.

Application filed December 16, 1889. Serial No. 333,975. (No model.)

*To all whom it may concern:*

Be it known that I, CARELIUS HANSEN, a citizen of the United States, residing at Beloit, in the county of Rock and State of Wisconsin, have invented certain new and useful Improvements in Plows, of which the following is a specification.

The object of this invention is to attach the beam to the plow proper in such a manner as to admit of a lateral adjustment, to give more or less land, according to the number of horses employed.

In the accompanying drawings, Figure 1 is an isometrical representation of a plow embodying my invention. Fig. 2 is a plan view of the same. Fig. 3 is a side elevation in which the mold-board has been removed and its position shown in dotted lines. Fig. 4 is a section on dotted line $x$, Fig. 3.

The plow represented in the drawings is of the usual construction; and it consists of the landside 1, mold-board 2, and share 3, bolted together in the ordinary manner, also a brace 4, connecting the landside and share.

The beam 5 is of the form generally employed in steel plows, and has a connection with the plow proper in a manner which I will now describe. To the inner face of the landside is bolted a curved socket by the bolts passing through its base portion 6. The socket proper 7 is provided with two square perforations 8. The lower end of the plow-beam is in curved form to fit within the socket 7, and is provided with two elongated openings 9. The inner face of the lower end of the plow-beam around the elongated openings is serrated, as shown at 10. Bolts 11 are passed from the convex surface of the socket through the openings therein and through the elongated openings 9 in the plow-beam, and washers 12, having one convex serrated face, are placed on the bolts so that the serrations of the washers will engage the serrations of the concave face of the lower end of the beam, and screw-nuts 13, turned on the ends of the bolts, will clamp the parts together in a firm manner. The square portion of the bolt near its head will enter the square openings in the socket, and will thereby hold the bolt from turning. The plow-beam has a pivotal connection with the mold-board, as shown in the drawings, and such connection consists of an eye 14, riveted to the rear face of the mold-board, and receives a pintle 15, which in this instance is bolted to the inside of the beam above the beam's socket-connection with the landside. The lower end of the pintle is screw-threaded, upon which is turned a screw-nut 16. By this construction of a plow I am able to adjust the forward end of the beam laterally to change the line of draft with relation to the plow to give more or less land to the plow, according to the number of horses employed, and the extent of said adjustment will be the length of the elongated openings in the lower end of the beam. When it is required to adjust the plow-beam, the screw-nuts are loosened sufficiently to permit the disengagement of the washers 12 with the lower end of the plow-beam. The beam is then removed laterally the required distance, the pivotal connection of the beam with the mold-board forming the pivot for such movement, and the screw-nuts again tightened, which will clamp the parts firmly together.

I claim as my invention—

1. In combination with a plow proper, an eye secured to the mold-board, a pintle secured to the plow-beam and fitted to oscillate in the eye, a socket secured to the framework or landside of the plow, the lower end of the beam fitted to the socket and provided with elongated openings, and means for adjustably clamping the beam to the landside, substantially as set forth.

2. The combination of a plow proper, an eye secured to the mold-board, a pintle secured to the plow-beam and fitted to oscillate in the eye, a socket secured to the framework or landside of the plow, the lower end of the beam fitted to the socket and provided with elongated openings and having serrations around the openings, bolts connecting the socket and beam, washers having a serrated face placed on the bolts and engaging the serrated face of the beam, and screw-nuts clamping the parts together, substantially as set forth.

CARELIUS HANSEN.

Witnesses:
EDWARD F. HANSEN,
CHARLES L. HANSEN.